C. JASS.
CONTROLLER BOX.
APPLICATION FILED MAR. 13, 1911.
1,009,668.
Patented Nov. 21, 1911.
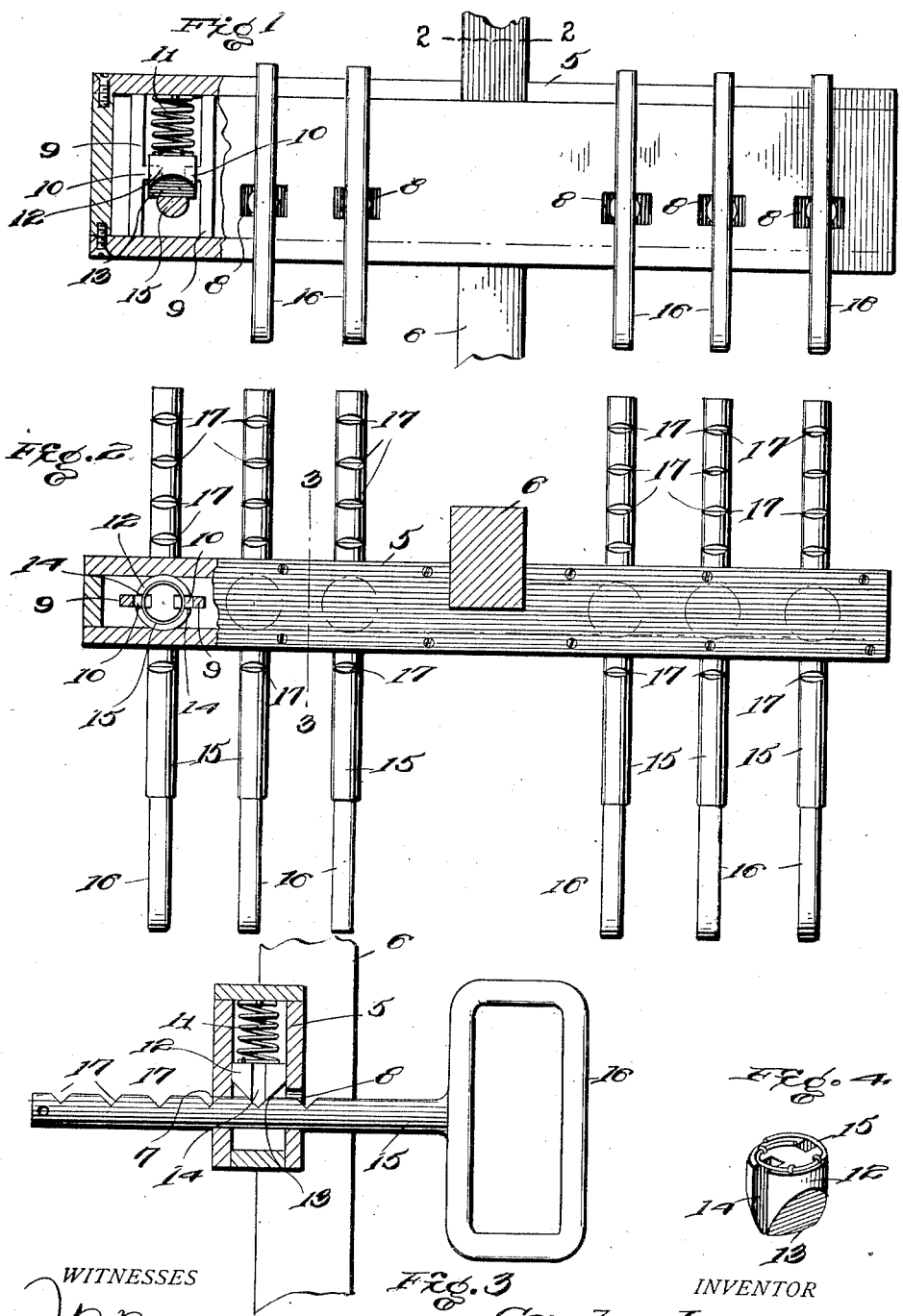
WITNESSES
INVENTOR
Carl Jass.
By E. E. Trooman,
his Attorney.

UNITED STATES PATENT OFFICE.

CARL JASS, OF HORICON, WISCONSIN.

CONTROLLER-BOX.

1,009,668. Specification of Letters Patent. Patented Nov. 21, 1911.

Original application filed May 27, 1909, Serial No. 498,596. Divided and this application filed March 13, 1911. Serial No. 614,061.

*To all whom it may concern:*

Be it known that I, CARL JASS, a citizen of the United States, residing at Horicon, in the county of Dodge and State of Wisconsin, have invented certain new and useful Improvements in Controller-Boxes, of which the following is a specification, reference being had therein to the accompanying drawing.

This invention relates to the subject of planters and drills such as is disclosed in my co-pending application Serial No. 498,596, filed May 27, 1909, wherein adjustable pulverizing mechanism, seed planting mechanism, and other mechanisms incidental to agricultural machines of that nature are employed and which mechanisms are operated by the rotation of the wheels of the machine, and the principal object of the same is to provide a novel controller box for holding the pins which are employed for operating the cables or rods that control said mechanisms.

In the accompanying drawings a preferred and practical embodiment of my invention has been shown, wherein:

Figure 1 is a view in rear elevation of the improved controller box, the box being shown broken away at one end portion and the support for the box being shown fragmentarily. Fig. 2 is a horizontal sectional view taken on the line 2—2, Fig. 1, the box being broken away at one end. Fig. 3 is a transverse sectional view taken on the line 3—3, Fig. 2. Fig. 4 is a detail perspective view of one of the pin locking pawls.

This application is a division of the application hereinbefore mentioned and comprises an elongated box or casing 5 that is preferably rectangular in shape and is supported in a horizontal position by a vertical standard 6 that projects from the rear of a planter frame (not shown) adjacent an operator's seat. Said box 5 has its front and rear surfaces provided with a plurality of regularly spaced openings 7 and 8, the front openings 7 being in alinement with the rear openings 8. Internally, the box 5 is provided with a plurality of pairs of spaced parallel bars 9 that are vertically arranged and disposed so that one pair is provided for each set of alined openings 7 and 8. Each bar 9 has its inner longitudinal edge provided with a laterally projecting lug 10, said lugs being oppositely disposed. Suspending springs 11 are carried by the inner surface of the top of the box 5 and suspend pawls 12 between each pair of bars 9. Said pawls have tapering, or wedge-shaped free ends 13 and their sides are provided with longitudinal grooves 14 that are engaged by the lugs 10 so that the said pawls have vertical movements only. Pins 15 extend through the alined openings 7 and 8 from the rear of the box 5, said pins being provided with handgrips 16 and being provided with regularly spaced transverse notches 17 which are adapted to be engaged by the pawls 12 to lock the pins in the desired positions. The notches 17 are preferably V-shaped so that by giving the pins a sharp blow or a sharp pull, the pawls will ride from engagement with said notches.

The pins 15 are substantially the same as that disclosed in my prior application before mentioned and are connected to the cables that control the operations of the mechanisms disclosed therein so that said mechanism can be independently controlled by the operator.

What I claim is:—

1. A controller of the kind described comprising a casing, said casing being provided with front and rear alined openings, spaced parallel bars in said casing arranged in pairs for each set of alined openings, said bars being provided with guiding lugs, locking pawls movable between each pair of bars and provided with side grooves that are engaged by said lugs, springs for yieldably suspending said pawls from the top of said casing, and pins extending through said alined openings and provided with transverse notches that are engaged by said pawls.

2. A controller of the kind described comprising a casing provided with transverse openings, notched pins slidable through said openings, pawls yieldably suspended within said casing for engaging said pins and provided with side grooves, and vertically arranged guiding means in said casing engaging said grooves.

3. A controller of the kind described comprising a casing, notched pins slidable therethrough, locking pawls suspended in said casing for engaging said pins, and vertically arranged guiding means in said casing engaging said pawls.

In testimony whereof I hereunto affix my signature in presence of two witnesses.

CARL JASS.

Witnesses:
   EDWARD C. DOWE,
   AHYMAR P. BOUTON.

Copies of this patent may be obtained for five cents each, by addressing the "Commissioner of Patents, Washington, D. C."